United States Patent [19]

Martini

[11] 3,907,345

[45] Sept. 23, 1975

[54] DOG KENNEL GATE LATCH

[75] Inventor: Leo J. Martini, South Gate, Calif.

[73] Assignee: Master Fence Fittings, Inc., La Habra, Calif.

[22] Filed: July 1, 1974

[21] Appl. No.: 484,665

[52] U.S. Cl............................ 292/68; 292/DIG. 13
[51] Int. Cl.².......................................... E05C 5/00
[58] Field of Search.............. 292/4, 5, 6, 7, 57, 58, 292/59, 67, 68, DIG. 13, DIG. 65

[56] References Cited
UNITED STATES PATENTS

| | | | |
|---|---|---|---|
| 1,896,909 | 2/1933 | Maxwell | 292/68 X |
| 2,074,759 | 3/1937 | Richards | 292/68 |
| 2,666,660 | 1/1954 | Youngworth | 292/68 |

Primary Examiner—Robert L. Wolfe
Attorney, Agent, or Firm—Knobbe, Martens, Olson, Hubbard & Bear

[57] ABSTRACT

A gate latch for use in pet kennels which is designed to prevent an animal from unlatching the gate. The latch includes a bracket member having two vertical slots and a locking member which slides vertically in said slots. The locking member has two tabs which move within said slots and rotates within a pair of pivot apertures at the top of each of the slots to allow the locking member to pivot out of engagement with the adjacent fence post or gate post.

7 Claims, 6 Drawing Figures

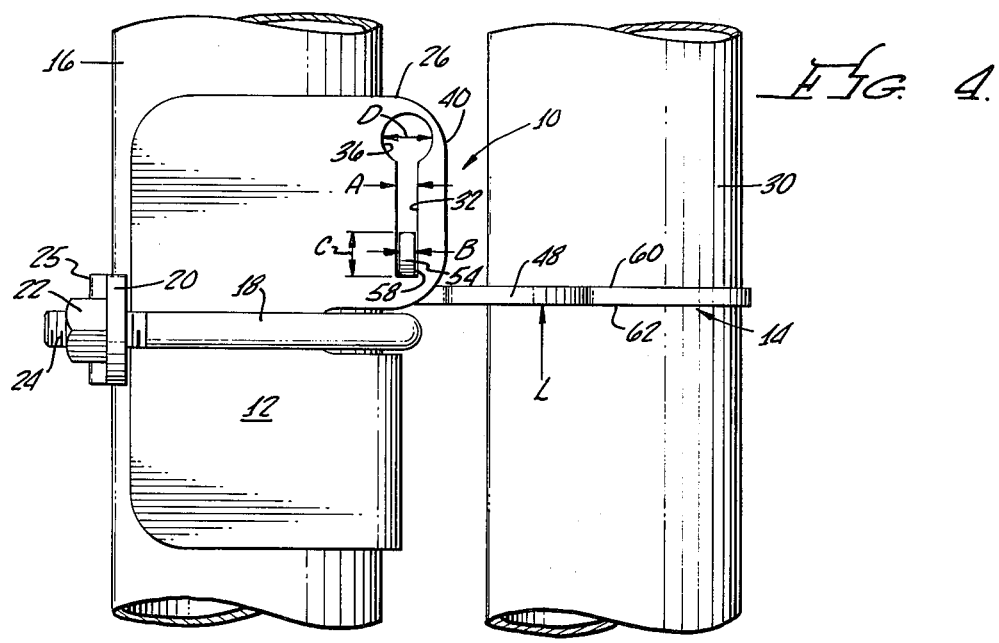
FIG. 4.
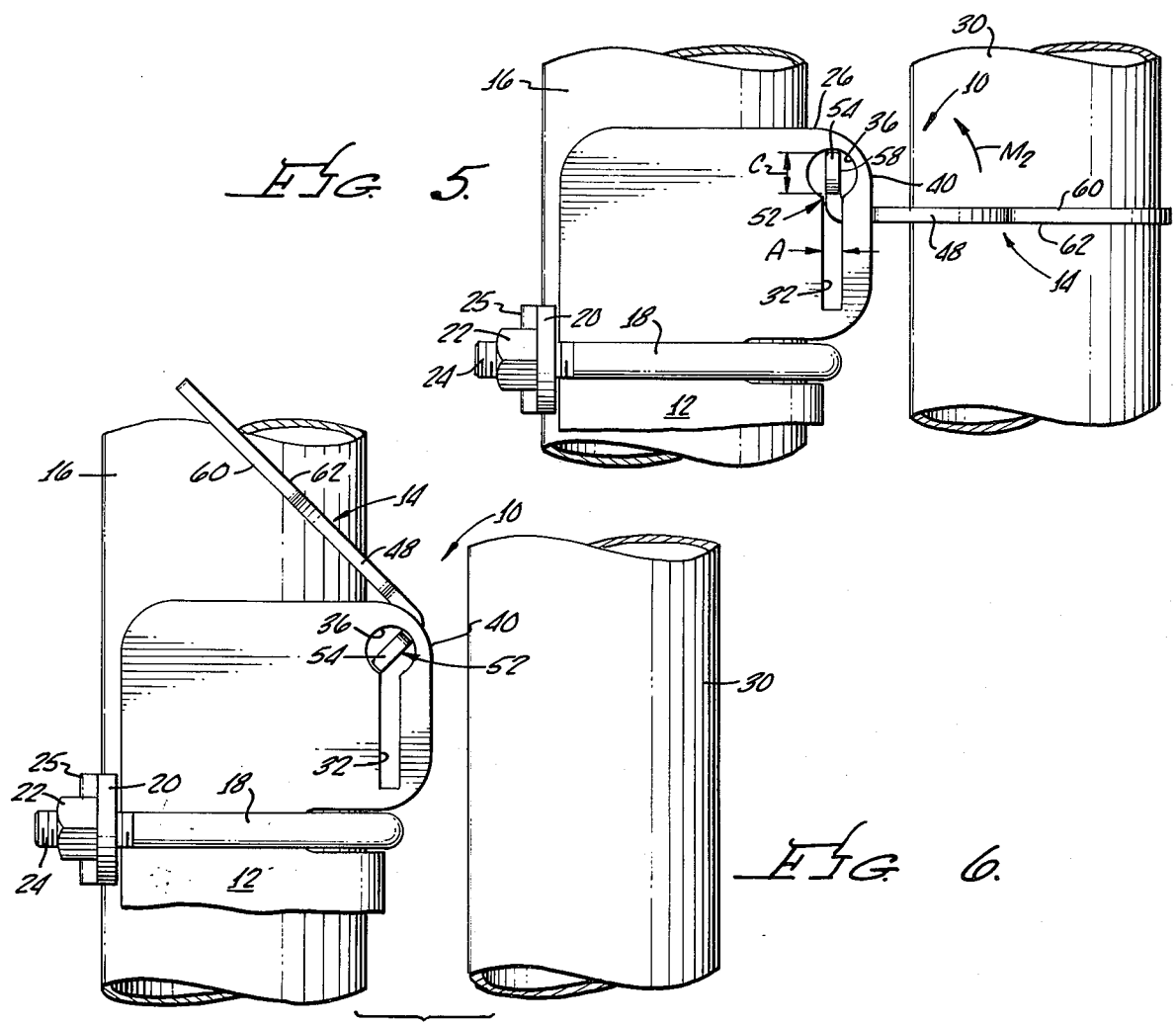
FIG. 5.
FIG. 6.

DOG KENNEL GATE LATCH

BACKGROUND OF THE INVENTION

This invention relates to the field of gate latches and more specifically to gate latches which are designed to prevent an animal from being able to unlatch the gate and secure his freedom. A rather prevalent problem not only in dog kennels, but also in a homeowner's yard fenced for confinement of a domestic pet is the concern of the animal being able to unlatch the gate latch.

In prior art kennel gate latches the latch was designed in such a manner that the larger dogs or animals are able to eventually learn how to unlatch the gate. This results mainly from the dog being able to use his paw, nose or teeth to move one part of the gate latch in order to disengage the gate from the fence. Consequently, it has become necessary for people to secure the latch by using a locking means such as a padlock on the gate. However, this poses an inconvenience, since the gate must be both unlocked and unlatched each time the gate is used. In the case of dog kennels the inconvenience is amplified by the presence of a multitude of gates utilized in the confinement of various dogs and other pets where the gates are used quite frequently in the course of feeding and care of the animals. Therefore, the need arose for a gate latch which the animal could not unlatch, but would always be in an unlocked condition, so that an individual could easily unlatch the gate to enter the confined area containing the animal.

Prior art latching mechanisms have been constructed which require a complex movement of a latch mechanism for opening in an attempt to prohibit animals from manipulating the latch. Such mechanisms however have failed to achieve this purpose because of a number of shortcomings. As an example, some such latches are constructed such that the force of gravity on the latching mechanism will accomplish a portion of the complex movement, so that the animal need only accomplish part of the latch opening procedure and the remaining steps of the complex movement will be accomplished by gravity. In addition, prior art mechanisms have failed to take advantage of the animals' access to only one side of the fence and the resulting potential for constructing a latch which may be opened from one side only by a precise maneuver requiring visual and manual coordination such as is found only in humans.

SUMMARY OF THE INVENTION

The gate latch disclosed herein utilizes a latching member which is slidably mounted on a holding bracket. The latching member has insert tabs which slide within vertical slots in the holding member, one such slot located on each side of the gate. Each of the vertical slots terminates at its upper end in a pivotal aperture in which the insert tabs rotate to allow the rotation of the locking member or latching member out of engagement.

In order for the locking member to be opened, the locking member must first be raised vertically within the vertical slots against the force of gravity until each of the insert tabs is located within the pivotal apertures on either side of the gate. The latching member must then be rotated against the force of gravity while still maintaining the pair of tabs within the pivotal apertures.

The latching member has two extending flanges or handles which are used to move the latching member by the operator wishing to unlatch the gate. These flanges are grasped by the operator to enable him to move the latching member vertically within the vertical slots while maintaining the latching member in a horizontal orientation and to permit the operator, while still maintaining the latching mechanism horizontal, to rotate the latching mechanism within the pivotal apertures. However, movement caused by a simple vertical force underneath either of these handle flanges, as would be accomplished by an animal, will move only one of the insert tabs up into the pivot aperture and, therefore, it will be unable to pivot the latching member. For this reason a dog, for example, will not be able to move the latching member out of engagement to unlatch the gate.

BRIEF DESCRIPTION OF THE DRAWINGS

FIGS. 4–6 are side views of the gate latch showing the steps in the movement of the gate latch from the closed to opened positions.

DETAILED DESCRIPTION OF THE INVENTION

Figure 1:
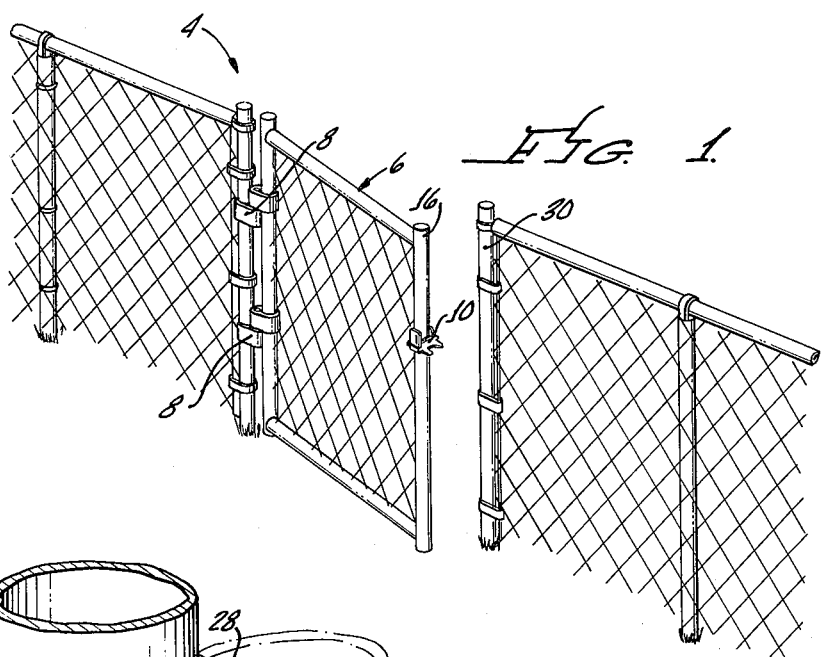
FIG. 1 is a perspective view of a fence having a gate on which the gate latch is mounted.
Figure 2:
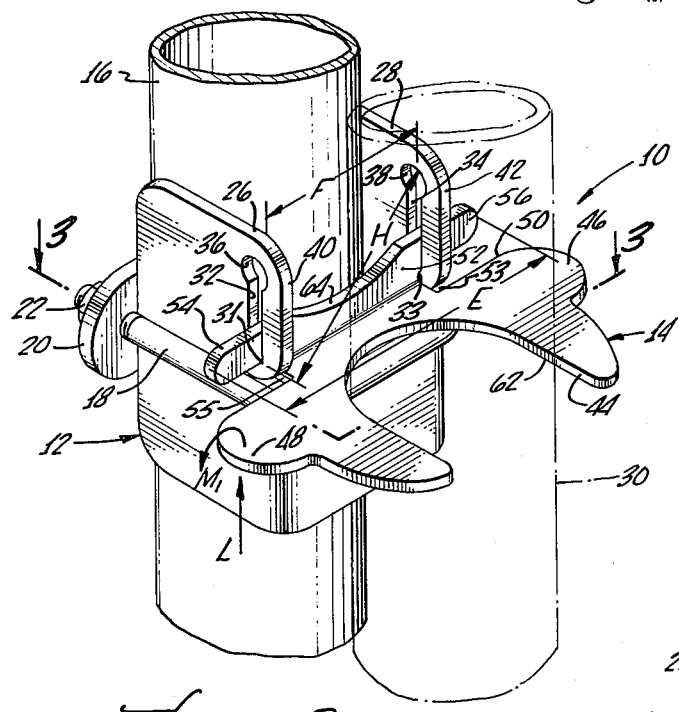
FIG. 2 is a perspective view of the gate latch.
Figure 3:
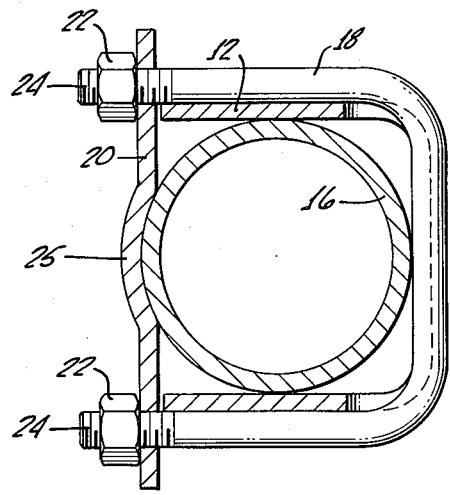
FIG. 3 is a sectional view taken along the lines 3—3 in FIG. 2.

FIG. 1 shows a typical fence 4 mounted along a vertical plane and having a gate 6 mounted to swing about a vertical axis on the hinges 8. Affixed to the gate 6 is a gate latch 10. FIG. 2 represents in more detail the gate latch 10, comprising a holding member 12 and a latching member 14. As shown in FIGS. 1, 2 and 3, the holding member 12 is rigidly attached to a vertical gate post 16 by a U-shaped bolt 18 and a holding plate 20 secured by the nuts 22 on the threaded ends 24 of the U-shaped bolt 18. The holding plate 20 has a curved portion 25 to mate with the post 16. With reference to FIG. 2, the holding member 12 has two substantially planar support flanges 26 and 28 which extend away from the gate post 16 and the gate 6 and are substantially parallel to one another and parallel to the plane of the gate 6. When the gate 6 is closed, flanges 26 and 28 are parallel to the fence 4. The flanges 26 and 28 are thus positioned on alternate sides of the fence 4, so that, when the gate 6 is closed, only one flange is accessible from either side of the fence 4.

Located in the respective flanges 26 and 28 are elongate vertical guide slots 32 and 34. The upper ends of the guide slots 32 and 34 terminate into circular pivot apertures 36 and 38, respectively, the diameter of which is greater than the width of the slots 32 and 34. It should be noted that the forward portions 40 and 42 of the respective flanges 26 and 28 extend away from the gate post 16 in order that the space between the slots 32 and 34 and the apertures 36 and 38 is not blocked by the gate post 16.

The latching member 14 has a forked or U-shaped opening 44 designed to engage a final fence post 30 (FIG. 1). Located on opposite sides of the opening 44 are an outside handle 46 and an inside handle 48. Attached to the rear edge 50 of the latching member 14 is a guide member 52. The guide member 52 may conveniently be formed as a unitary portion of the latching member 14, but is bent at a right angle thereto. The latching member 14 is cut away to form slots 53 and 55 between the handles 46 and 48, respectively, and the guide member 52. The guide member 52 thus has a pair of extending insert or end tabs 54 and 56 adjacent the slots 53 and 55, respectively. As shown more clearly on FIG. 4, it should be noted that the width A of the slots 32 and 34 is approximately the same or slightly larger than the thickness B of the tabs or struts 54 and 56, so that the tabs will maintain their vertical orientation as they slide within the slots (slot 34 and tab 56 are hidden). This vertical orientation maintains the latching member 14, which is perpendicular to the tabs 54 and 56, horizontal, and thus engaged with the post 30. The end tabs 54 and 56 and the respective slots 32 and 34 constitute mounting means for the latching member 14 on each side of the gate 6.

Again referring specifically to FIG. 4, the height C of the tabs 54 and 56, while being greater than the slot width A, is less than the interior diameter D of the pivot apertures 36 and 38 (tab 54 and aperture 38 are hidden). As shown in FIG. 2, the length E of the guide member 52 is greater than the space F between the flanges 26 and 28, so that the latching member will always remain mounted within the holding member even when canted resulting from an animal lifting one handle 46 or 48 only. In addition, the length E of the guide member 52 is greater than the diagonal distance H between the pivot aperture 38 and the bottom 31 of the slot 32. Consequently, if only one end tab 54 or 56 is pushed up into the respective pivot aperture 36 or 38, the length E of the guide member will be great enough to retain the guide member within the flanges 26 and 28 when in this angled orientation.

Operation of the gate latch 10 is best explained in reference to FIGS. 4 to 6 with FIG. 4 showing the latching member 14 in the latched position on the fence post 30. The upper surface 60 of the latching member is approximately perpendicular to the fence post 30. The tabs 54 and 56 are situated in the lower ends of the slots 32 and 34, so that the face 58 of the guide member 52 is in a vertical orientation.

Referring to FIGS. 4-6, in order to unlatch the gate from the fence post 30, the operator grasps either the inside handle 46 or the outside handle 48 with one finger positioned on the lower surface 62 of either the inside or the outside handle 46, 48 and another finger positioned on the upper surface 60 of the same handle. If only a direct upward force L were exerted on the lower surface of the handle 48, only one side of the guide member 52 and its respective end tab 54 would move up into its pivot aperture 36, resulting in the latch member 14 being in a canted or diagonal position which would not allow pivoting of the latch member away from the fence post. The other end tab 56 would remain at the bottom 33 of slot 34 (shown on FIG. 2). A similar situation would occur if the force L had been applied to the lower surface 62 of the inside handle 46 with the end tab 56 moving up into the pivot aperture 38 and the end tab 54 remaining in the bottom 31 of the slot 32.

Referring to FIG. 2, in order to move the latching member 14 upward and at the same time maintain it in a generally level or horizontal orientation, so that both tab ends 54 and 56 of the guide member 52 will reach the respective pivot apertures 36 and 38, a slight moment force $M_1$ is exerted on the handle 48 of latch member to counteract the weight of the latch member on the other side of the post 16.

To produce this moment force $M_1$ the finger on the lower surface 62 of the handle 48 acts as a fulcrum, with a force upward, and the finger on the upper surface 60 exerts a force to counterbalance the extended weight of the latch on the other side of the fence post.

The operator maintains this moment force $M_1$ in the handle 48 and exerts addition force L to lift the latch member 14, against gravity, upward, maintaining the guide member 52 in a level or horizontal orientation as it moves up the slots 32 and 34. When the end tabs 54 and 56 reach the pivot apertures 36 and 38, as shown in FIG. 5 (end tab 56 and pivot aperture 38 are hidden), the operator must exert another moment force $M_2$ on the handle 48 to cause the latching member 14 to pivot on the end tabs 54 and 56 in the pivot apertures 36 and 38. The latching member must be pivoted upward and toward the gate post 16, to the position shown in FIG. 6, requiring a distinct positive moment force to counteract gravity forces. In the fully open position shown in FIG. 6, the latching member 14 has passed beyond a vertical orientation, so that the force of gravity will maintain the latch open until a moment, opposite in direction to moment $M_2$, is applied.

The requirement to not only exert a moment force $M_1$ on the handle and a force L to lift the latching member 14 in a horizontal orientation, but also the moment force $M_2$ to pivot the latching member upward in order to unlatch the gate makes it impossible for animals such as dogs to unlatch the gate. Even if the extremely rare circumstance would occur where the dog would manage to move the latch upward in a level orientation to the pivot apertures 36 and 38, it would be impossible for it to both hold the end tabs within the pivot apertures and rotate the latching member up over the holding member 12 and back to the gate post 16.

Referring to FIG. 2, the latching member 14 may be locked in the latched position by the insertion of a padlock in either of the pivot apertures 36 and 38. Located in the central portion of the guide member 52 between the flanges 26 and 28 is a curved recess 64 to accommodate the gate post 16 when the latching member 14 is in the open position as shown in FIG. 6.

What is claimed is:

1. A gate latch for attachment between a gate post and an adjacent fence post, said gate latch comprising:
    a holding member rigidly attached to one of said posts;
    a latching member for engagement with the other of said posts;
    a pair of guide slots in one of said holding member and said latching member; and
    means connected to the other of said holding member and said latching member cooperating with said slots for movably mounting said latching member on said holding member, said mounting means being movable within the length of one of said slots independent of its motion in the other of said slots, said guide slots being vertical and said mounting means being a pair of end tabs, each of said end tabs slidably inserted in one of said pair of vertical guide slots, each of said pair of slots located on opposite sides of said fence.

2. A gate latch comprising:
    a holding member;

two support flanges connected to said holding member, each of said flanges having a guide slot with a pivot aperture at one end;
a latching member movably mounted on said holding member; and
a guide member attached to said latching member and having end tabs, said guide slots receiving said end tabs, the distance between said end tabs being greater than the distance between said support flanges, so that said guide member cannot be removed from said holding member.

3. A gate latch as defined in claim 2 wherein said pivot apertures are larger than the cross-sectional area of said end tabs, said locking member being pivotal when said end tabs are located in said pivot apertures.

4. A kennel gate latch for securing a gate to a fence post, said latch comprising:
a holding member mounted on one of said fence post and said gate, said bracket having a pair of guide slots and a pair of pivot apertures at one end of said pair of guide slots;
a latching member slidably and pivotally mounted on said holding bracket, said locking member having a first and a second position on said holding bracket; and
a pair of guide tabs connected to said locking member, said guide tabs having a height greater than the interior width of said slots, said apertures having an interior size greater than said height of said tabs, said tabs situated within said slots when said locking member is in said first position, said tabs being located within said apertures when said locking member is in said second position.

5. A kennel gate latch for attachment between a gate post and an adjacent fence post, said latch comprising:
a guide bracket mounted on one of said gate post and said fence post and having two support flanges extending toward the other of said gate post and said fence post, each of said flanges having a vertical guide slot terminating at its upper end into a pivot aperture having a larger interior size than said slot;
a latching member slidably mounted on said guide bracket and having a U-shaped opening for receipt of said other of said gate post and said fence post;
an outside handle attached to one side of said latching member,
an inside handle attached to the other side of said latching member; and
two guide struts connected to said latching member, said struts extending into said guide slots approximately perpendicular to said support flanges, said inside handle causing one of said guide struts to move into one of said pivot aperture when a force is applied on the bottom surface of said inside handle, the other of said guide struts remaining in the other of said slots, preventing said latch member from pivoting to an open position.

6. A latch for use in cooperation with a gate member and a fence member, said latch comprising:
a stationary body having a pair of vertical guide slots attached to one of said fence member and gate member, each of said slots terminating at its upper end in a circular aperture which is larger than the interior width of said slots;
a locking member having an opening for receipt of the other of said fence member and gate member; and
a pair of tabs attached to said locking member, said tabs slidably received in said slots, said locking member in a horizontal position when said tabs are in said slots, said tabs having a thickness approximately the same as said interior width of said slots, said locking member pivotal to a vertical position when said tabs are in said apertures.

7. A gate latch comprising:
a holding member;
two support flanges connected to said holding member, each of said flanges having a guide slot with a pivot aperture at one end;
a locking member movably mounted on said holding member; and
a guide member, the face of said guide member being approximately perpendicular to the surface of said locking member, said guide member movable between two positions, said face of said guide member being vertical within said slots in said first position, said face being inclined in said aperture in said second position, said locking member being horizontal when said guide locking member is in said first position, said locking member being inclined toward said flanges when said guide member is in said second position.

* * * * *